Figure 1:
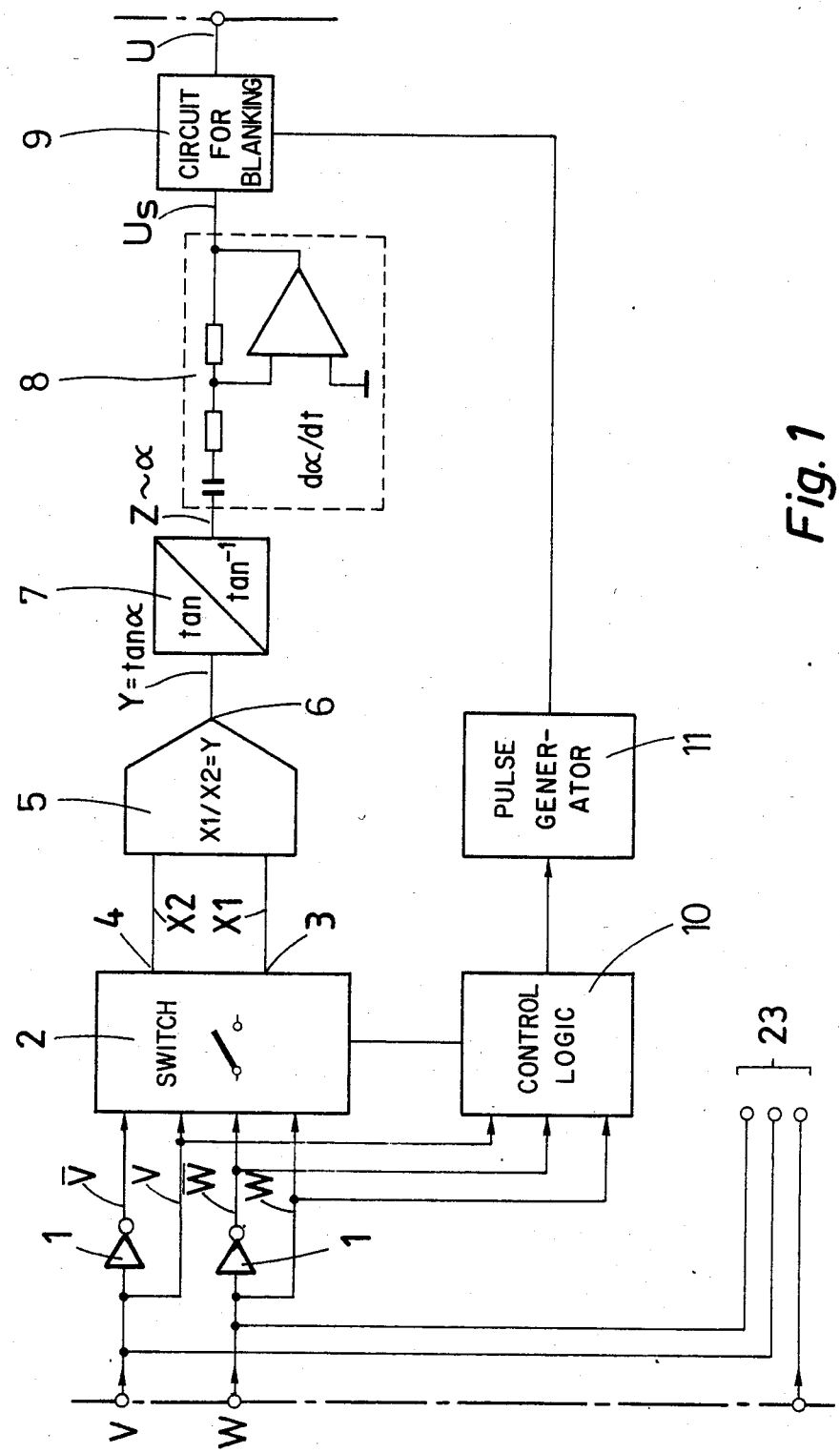

United States Patent [19]

Pluddemann

[11] Patent Number: 4,680,721
[45] Date of Patent: Jul. 14, 1987

[54] CIRCUIT ARRANGEMENT FOR GENERATING AN ELECTRIC VELOCITY SIGNAL

[75] Inventor: Gerhard Pluddemann, Nussbach, Fed. Rep. of Germany

[73] Assignee: Mavilor Systemes S.A., Switzerland

[21] Appl. No.: 675,842

[22] Filed: Nov. 28, 1984

[30] Foreign Application Priority Data

Dec. 22, 1983 [CH] Switzerland ............... 6853/83

[51] Int. Cl.[4] .................. G01P 3/42; G01R 23/00
[52] U.S. Cl. .................... 364/565; 324/160; 328/133; 364/484; 364/550
[58] Field of Search ............... 364/484, 550, 565, 807, 364/817; 324/160, 163; 328/132, 133; 307/517

[56] References Cited

U.S. PATENT DOCUMENTS

| 3,496,565 | 2/1970 | Jenkins | 364/851 |
| 4,019,145 | 4/1977 | Rathe | 328/133 |
| 4,380,733 | 4/1983 | Yano et al. | 364/565 |

FOREIGN PATENT DOCUMENTS 3107938 9/1982 Fed. Rep. of Germany.

Primary Examiner—Parshotam S. Lall
Assistant Examiner—Kevin J. Teska

Attorney, Agent, or Firm—Kane, Dalsimer, Kane, Sullivan and Kurucz

[57] ABSTRACT

The circuit arrangement processes two input signals which are periodically variable as a function of the position of a moving part and particularly of the angle of rotation of a rotating part and which are phase-shifted by approximately 90° with respect to each other and have a sinusoidal or sine wave-like characteristic. In an inverting circuit, inverted input signals are generated. A curve change-over switch assembles from the input signals and the inverted input signals two sequences of similar signals sections which are divided in a divider circuit which forms quotient signals which represent the variation of the tangent function. The y signals are then converted in a tangent/arc tangent converter by forming the arc tangent function into an at least approximately sawtooth-shaped voltage signal which consists of path-proportional path signals. These path signals are differentiated with respect to time in a differentiating circuit and finally the step positions of the differentiating operation are removed from the signals in a circuit. The result analog output signal is a voltage u which is proportional to the speed of the moving part and which can be supplied as actual speed of rotation to a servo control loop.

6 Claims, 15 Drawing Figures

CIRCUIT ARRANGEMENT FOR GENERATING AN ELECTRIC VELOCITY SIGNAL

The invention relates to a circuit arrangement for generating an electric velocity signal which is proportional to the velocity of a moving part and particularly to the speed of revolution of a rotating part, consisting of two continuous input signals which are periodically changeable as a function of the position of this moving part, and particularly of the angle of rotation, and which are phase shifted with respect to each other by approximately 90°, both having each in the mean the same frequency and a constant amplitude ratio and a sinusoidal or sine-like characteristic, a simple or integral multiple of the duration of the period of one input signal being equal to the time in which the moving part covers a certain distance and particularly a rotating part carries out one full revolution.

Such a circuit arrangement which processes continuous input signals generated by a digital incremental synchro-generator for detecting the speed of rotation of a rotating part has been disclosed (German Offen-Legungsschrift No. 3,107,938). These synchro-generators have a pulse disk which is joined to the rotating part or its rotating shaft and on which are provided markings in equidistant angular distances which are scanned by two detectors. The measurement signals of these synchro generators which operate in particular optically or magnetically change periodically with the angle of rotation of the rotating part between two extreme values corresponding to discrete angular positions in which a marking or the centre between two adjacent markings on the pulse disk is exactly located in front of a detector. During this process, sinusoidal or sine-like analog signals are produced.

For the purpose of a digital detection of rotational speed, the known circuit arrangement is adapted to emit counting pulses when the instantaneous amplitude of the measurement signal assumes a predetermined reference value, in particular when the amplitude passes through the voltage value of zero, and to count the counting pulses emitted within a certain measuring period by means of a pulse counter. In the predetermined measuring time, the number of counting pulses is then proportional to the speed of rotation. However, this measurement of speed of rotation becomes inaccurate with small numbers of rotation, that is to say if only a few counting pulses occur within the predetermined measuring time or, if the measuring times are correspondingly extended, this measurement requires measuring times which are too long which is generally not acceptable in control or regulating systems. In order to refine the digital rotational speed detection system, particularly with small rotational speeds, another special correction quantity is therefore derived in the known circuit arrangement from the measurement signals and used for improving the result obtained from the number of counting pulses.

Apart from the previously mentioned digital rotational speed detection system, the analog detection of the rotational speed by means of a tacho generator has been known for a long time but supplies in general a measurement signal which is only approximately proportional to the speed of rotation and which is also subject to fluctuations and interfering influences.

The present invention is based on the circuit arrangement initially described which, in principle, is suitable for detecting any movement, that is to say a rotational, linear or mixed movement as long as a sensor or detector system supplies the phase-shifted input signals mentioned. For example, linear scales are known which work in accordance with the principle of incremental generators for detecting the linear speed.

Figure 2:
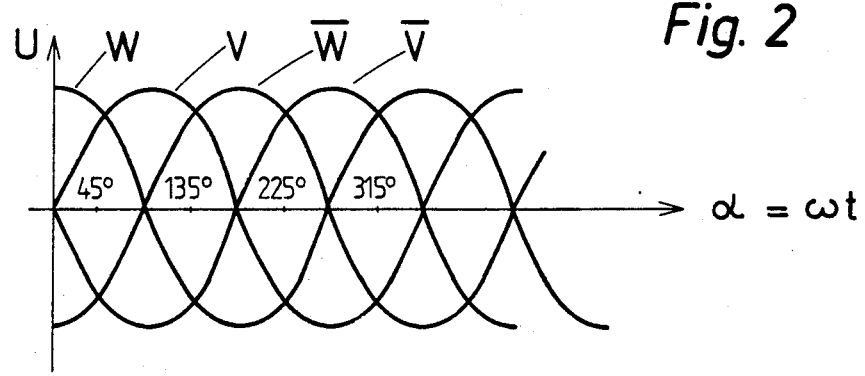
Figure 3:
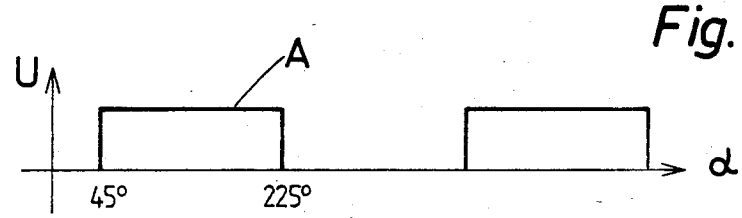
Figure 4:
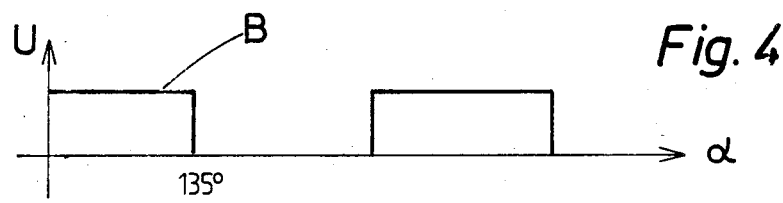
Figure 5:
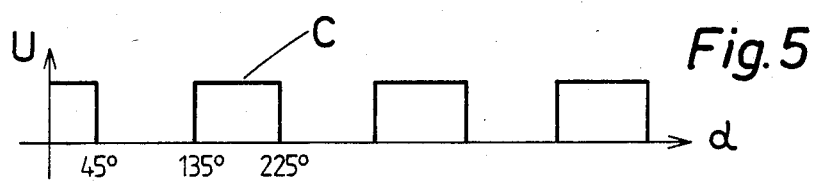
Figure 6:
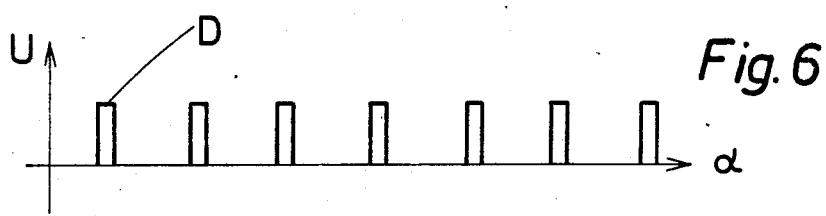
Figure 7:
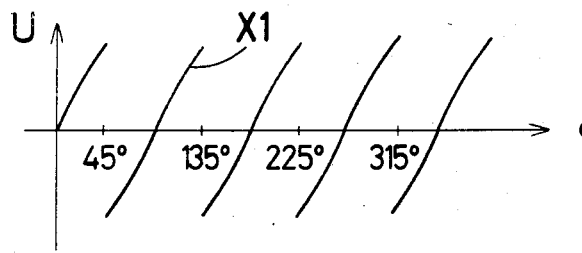
Figure 8:
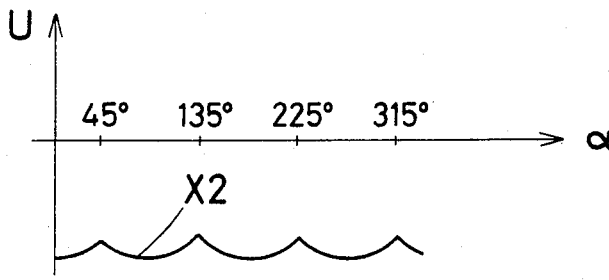
Figure 9:
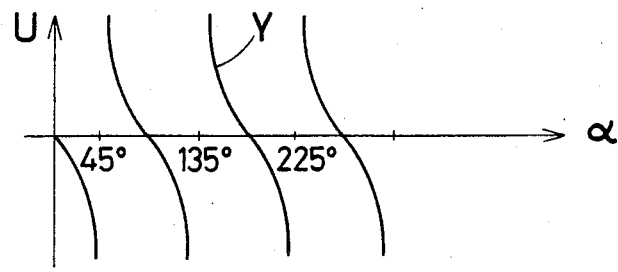
Figure 10:
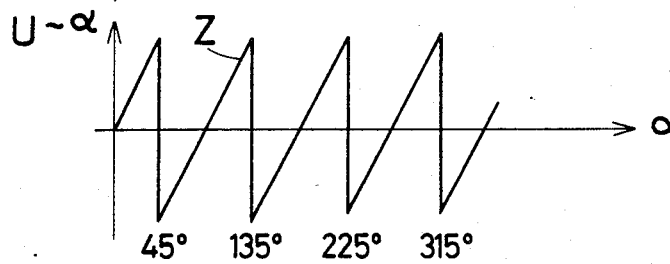
Figure 11:
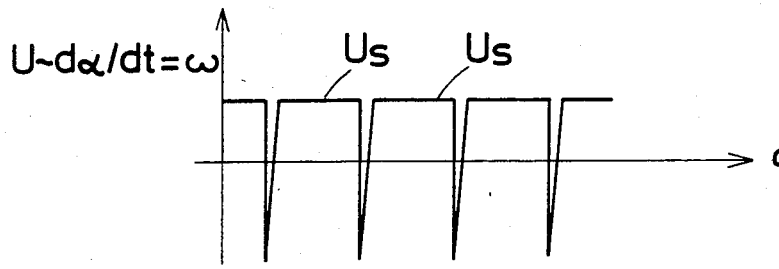
Figure 12:
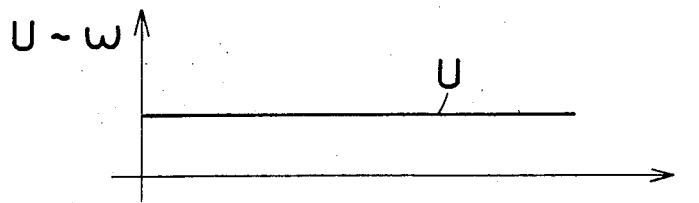
Figure 13:
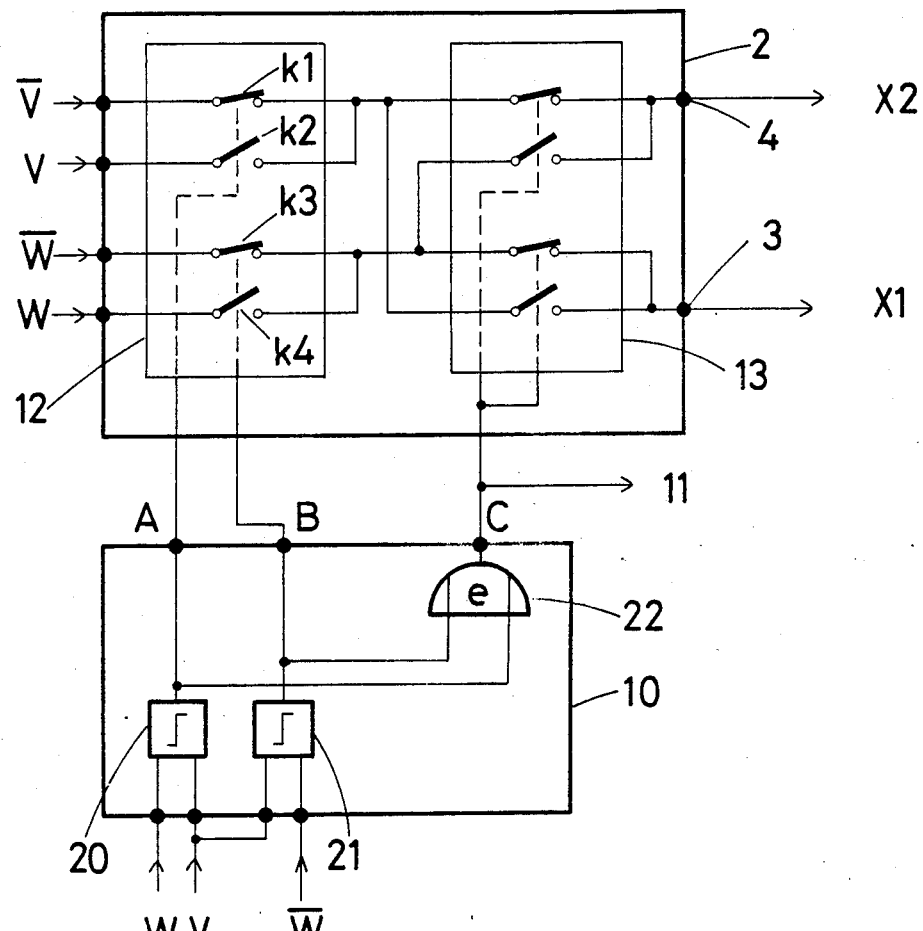
Figure 14:
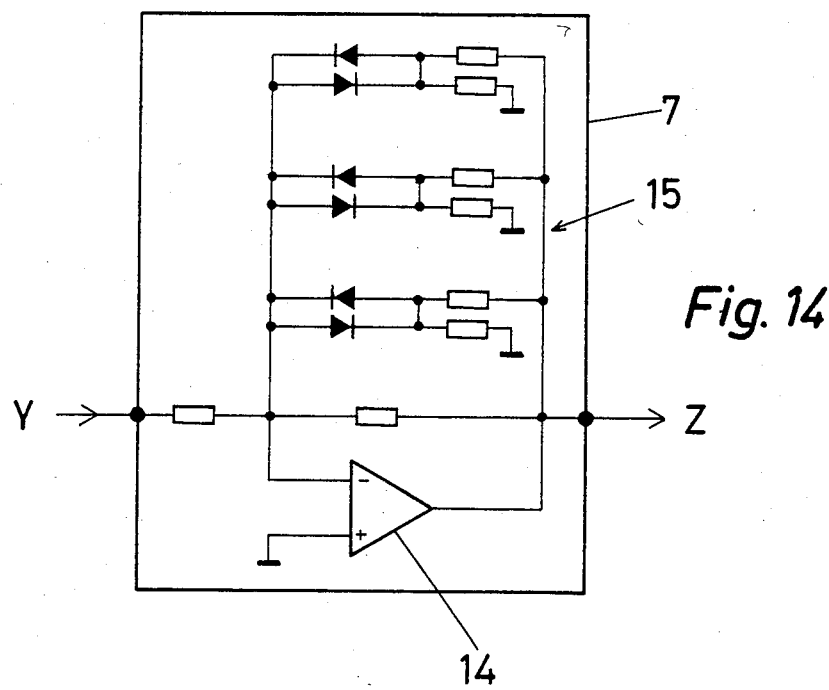
Figure 15:
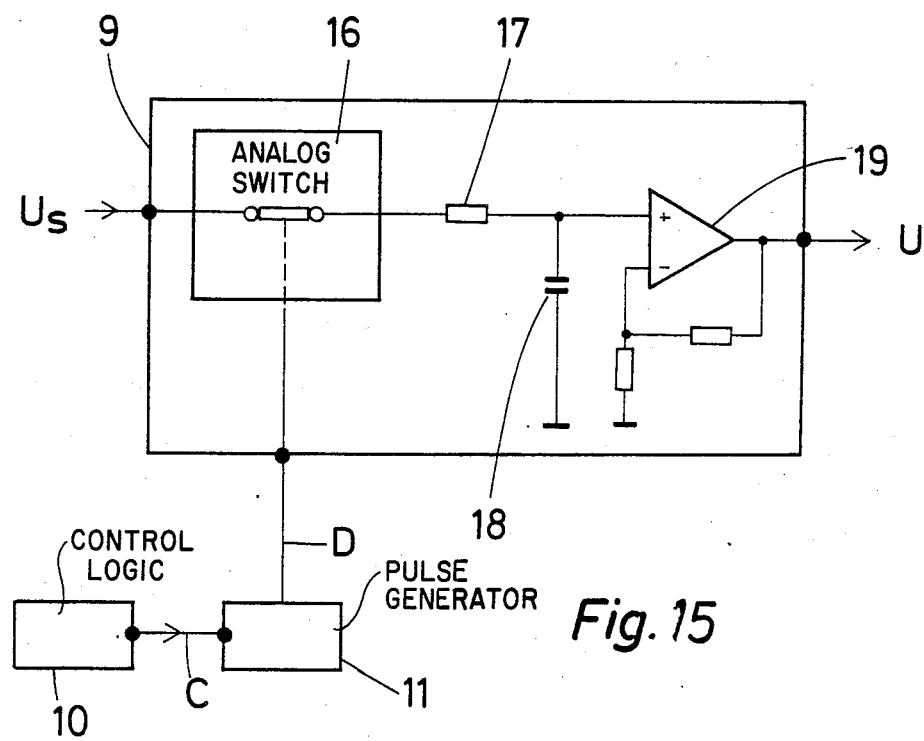

The invention is based on the aim of generating, whilst foregoing a tacho generator, an analog voltage which is proportional to the speed and to the direction of movement and which, like the analog voltage generated conventionally by a tacho generator, can be input as actual speed into a control or regulating system; this voltage should be largely independent of the quality of the sinusoidal shape of the input signals so that periodic signals having virtually any possible, even only remotely sine-like curve shapes and including also trapezoidal and triangular signals can be processed without problems. In addition, the processing of input signals should be largely independent of external interference. The circuit arrangement according to the invention should also still supply usable signals at very low speeds or rotational speeds and should still work correctly even at a speed or rotational speed close to zero, for example in servo control loops. According to the invention, this aim is achieved by the features specified in the characterizing clause of claim 1. In principle, the inventive concept consists merely of first dividing by each other the two Periodic input signals which are generated in some known manner and which have the form of voltages which are shifted in phase by 90°, then to convert the tangent function obtained into a path-proportional voltage signal by applying the appropriate arc tangent function and, finally, obtaining by differentiation a voltage which is proportional to the speed. For this reason, irregularities and distortions of the input signals and of the intermediate signals are largely eliminated by averaging so that the quality of the resulting analog output signal is comparable to the quality of a signal supplied by a good, servo-capable tacho generator and surpasses this signal especially at low rotational speeds; in time, all problems associated with the conventional tacho generators and especially problems caused by carbon brushes and inertia are eliminated. In addition, the origin of the two phase-shifted input signals is without significance; they can be generated by generators or transmitters of any construction or type working with optical, magnetic, linear or rotational systems. Suitable developments of the circuit arrangement according to the invention result from the dependent patent claims. The invention is explained in greater detail on a typical embodiment relating to the detection of a rotational movement, utilizing the drawings in which:

FIG. 1 shows a block diagram of a circuit arrangement according to the invention, FIG. 2 shows the variation with time of input signals and inverted input signals, FIGS. 3, 4 and 5 show the switching pulses derived from input signals, FIG. 6 shows the blanking pulses also derived from the input signals, FIGS. 7 and 8 show the output signals, derived from similar curve sections of the input signals, of the curved change-over switch, FIG. 9 shows the output signal, consisting of similar sections of the tangent function of the angle of rotation, of the divider circuit, FIG. 10 shows the angle-proportional output signal, consisting of similar sections, of the tangent/arc tangent converter, FIG. 11 shows the output signal, produced by differentiating the signals of FIG. 10 of the differentiating circuit, FIG. 12 shows the resultant analog output voltage which is proportional to the speed of rotation, FIG. 13 shows a block diagram of the curve change-over switch 2, FIG. 14 shows a block diagram of the tangent/arc tangent converter 7 and FIG. 15 shows a block diagram of the circuit 9 which blanks out the step positions of the differentiating signal.

The input signals v and w processed by the circuit arrangement of FIG. 1 are shown in FIG. 2 and, in the example under consideration, are sinusoidal voltages U which are shifted in phase by 90°. These periodic voltages are generated by a known synchro generator having two detectors, for example by a so-called opto encoder. The two input signals can be represented in known manner by $v=U_o \sin \alpha$ and $w=U_o \cos \alpha$, $U_o$ being the amplitude of the voltage U and $\alpha=\omega t$ where $\omega$ is the angular frequency of the periodic input signals and t is the time. The synchro-generator supplying the input signals is constructed in such a manner that the time $\tau$, in which the rotating part or its rotating shaft carries out one full revolution, is equal to one integral multiple of the duration of the period T of the input signals, that therefore $\tau=N.T$, N being a whole number. Between the angle of rotation $\phi$ of the rotating part and the angle $\alpha$, accordingly, the relationship $\alpha=N.\phi$ applies and the angular frequency $\omega$ of the input functions is equal to N-times the angular velocity of the rotating part.

The circuit arrangement of FIG. 1 has the following components:
- an inversion circuit 1 which receives the two input signals v and w,
- an electronic curve change-over switch 2 having four inputs in two outputs 3 and 4,
- a divider circuit 5 following the curve switch 2 in the circuit,
- a tangent/arc tangent converter 7,
- a differentiating circuit 8,
- a circuit 9 which blanks out the step positions produced during the differentiating operation and supplies as an output signal an analog voltage which is proportional to the speed of rotation of the rotating part,
- a control logic 10 which is connected to three of the four lines leading to the inputs of the curve change-over switch 2 and controls this curve change-over switch 2 with the aid of switching pulses A, B, C (FIGS. 3, 4 and 5), and
- a pulse generator 11 which is also controlled by this control logic 10 and which controls the circuit 9 with the aid of blanking pulses D (FIG. 6).

The two input signals v and w are applied, on the one hand, directly to two inputs of the curve change-over switch 2 and, on the other hand, via one inverting section each of an inverting circuit 1 to two further inputs of the curve changeover switch 2. In the inverting circuit 1, the input signals v and w are converted, retaining their relative phase relationship, into the inverted input signals $\bar{v}$ and $\bar{w}$ which are also shown in FIG. 2. In this manner, the curve change-over switch 2 receives four input signals v, w, $\bar{v}$, $\bar{w}$, which are in each case shifted in phase by 90° and which are switched section by section to the two out-puts 3 and 4 in such a manner that at these outputs two sequences of in each case similar signal sections x1 and x2 appear, (FIGS. 7 and 8). These signal sections x1 and x2 are composed of similar curve sections, which succeed each other in time, of the four input signals v, w, $\bar{v}$ and $\bar{w}$ and are selected in such a manner that the signal sections x1 can be subsequently electronically divided in reasonable manner by the signal sections x2, that is to say that no zero transitions occur in the divisor or in the denominator, that is to say in the x2 signal sections, and that the resultant quotient signal representing the tangent function tan $\alpha$ does not become too large so that it can be easily processed. Preferably, therefore, signal sections x1 and x2 extending in each case over 90° are selected in such a manner that the resultant variation of the tangent function always lies within an angular area of approximately −45° to +45° (FIG. 9).

FIG. 13 shows the basic configuration of a curve changeover switch 2 which, in the example under consideration, consists of two series-connected analog switches 12 and 13 each having four electronic switching elements controlled by the control logic 10. These analog switches 12 and 13 can be, for example, TEXAS INSTRUMENTS components known by the designation TL 191 or HARRIS SEMICONDUCTOR components known by the designation HI 201. The control logic 10 operates with two known comparators 20, 21 and with an exclusive OR gate 22 connected to the outputs of the latter. The circuits of the comparators 20, 21 are arranged in such a manner that they operate like a Schmitt trigger. In the example under consideration, the comparator 20 compares the instantaneous amplitudes of the two input signals v and w and outputs voltage pulses, acting as switching pulses A (FIG. 3), in each case in the intervals in which the instantaneous amplitude of the input function v is greater than that of the input function w. These switching pulses A control the switching elements k1 and k2 of the analog switch 12 which assume the position shown in FIG. 12 in the presence of a switching pulse A and their other position in the absence of a switching pulse A. The comparator 21 compares the instantaneous amplitudes of the input signals v and of the inverted input signal $\bar{w}$ and outputs switching pulses B (FIG. 4) within the periods in which the instantaneous amplitude of the input signal v is greater than that of the inverted input signal $\bar{w}$. These switching pulses B control the switching elements k3 and k4 of the analog switch 12 which assume the position shown in FIG. 12 in the presence of a switching pulse B and their other position in the absence of a switching pulse B.

The four switching elements of the analog switch 13 are controlled by the switching pulses C (FIG. 5) generated by the exclusive OR gate 22, which pulses occur only whenever either only a switching pulse A or only a switching pulse B is present and thus have a duration which is only half as long as the duration of a switching pulse A or B. The four switching elements of the analog switch 13 assume the position shown in FIG. 13 in the presence of a switching pulse C and otherwise assume their other position. The beginning and end of the switching pulses thus virtually coincide with the points of intersection of the respective two input signals compared.

In the example of FIG. 13, using the illustrated positions of the switching elements shown symbolically as a basis, the inverted input signal $\bar{v}$ is switched to output 4 and the inverted input signal $\bar{w}$ to output 3 which, according to FIGS. 2 to 4, corresponds to the presence of a switching pulse A and of a switching pulse B and to the absence of a switching pulse C and, in the illustration of FIG. 2, takes place within the angular range of from $\alpha = 45°$ to $\alpha = 135°$. As long as subsequently the switching pulses A and C are present and a switching pulse B is not present, the inverted input signal $\bar{v}$ is switched to output 3 and the input signal w to output 4 which occurs within an angular range of from $\alpha = 135°$ to $\alpha = 225°$.

As soon as the switching pulses A and C cease, and the following switching pulse B is not yet present, the input signal v is switched to output 4 and the input signal w to output 3 which occurs within an angular range of from $\alpha = 225°$ to $\alpha = 315°$.

This is followed by the beginning of the switching pulses B and C which causes the input signal v to be switched to output 3 and the inverted input signal $\bar{w}$ to be switched to output 4 as long as the subsequent switching pulse A is not yet present, which switching occurs within an angular area of $\alpha = 315°$ to $\alpha = 45°$, and so forth.

In this manner, the sequences, shown in FIGS. 7 and 8, of similar signal sections x1 and x2 are generated at outputs 3 and 4 of the curve change-over switch 2 and are fed to the two inputs of the divider circuit 5. In this known divider circuit 5 which is, for example, an ANALOG DEVICES (USA) component known by the designation AD 533, the signal sections x1 are divided by the signal sections x2, forming a sequence of quotient signals y (FIG. 9). Since this divider circuit 5 processes only input voltages which are either both negative or of which one is positive and the other negative, signal sections x2 with negative voltage are generated in the example under consideration. The quotient signals y represent voltage signals which correspond to the tangent function tan $\alpha$ in inverted form. Because of the selection of the signal sections x1 and x2 mentioned, these are in each case the variation of the inverted tangent function within the $-45°$ to $+45°$ range and the amplitudes of the quotient signals y can be multiplied by a suitable constant factor.

The quotient signals y are converted in the tangent-/arc tangent converter 7, which is inversely connected in the example under consideration, into a sequence of path signals z, that is to say of angle signals in the case under consideration (FIG. 10), which are in each case voltages which are proportional to angles within the successive angular ranges $\alpha = -45°$ to $\alpha + 45°$, 45° to 135°, 135° to 225°, and so forth and which essentially form a sawtooth curve. By applying the arc tangent function, that is to say the reverse function of the tangent, to the tangent function tan $\alpha$, the non linear characteristic of the tangent function is indeed linearized and voltage signals are obtained which are proportional to the angle $\alpha$, or the angle of rotation $\phi$ of the rotating part, respectively, which signals vary linearly with constant speed of rotation and the slope of which is directly proportional to the angular velocity of the rotating part. FIG. 14 shows the basic wiring of the converter 7 which consists of known components, for example of a conventional operational amplifier 14 which is, for example, the TEXAS INSTRUMENTS component known by the designation LM 348, and of a resistance-diode network 15.

The sequence of path signals z is differentiated with respect to time t in the differentiating circuit 8 which is a circuit of a known type. Since the path signals z represent the variation with time of the angular position of the rotating part or of the angle $\alpha$, respectively, the result of the differentiation $d\alpha/dt = \omega$ represents the angular frequency, or the angular velocity proportional to it, of the rotating part in the form of voltage sections $u_s$ (FIG. 11). Since it is a sawtooth curve which is being differentiated, the voltage sections $u_s$ are interrupted by short-duration jumps or returns which have an interfering effect and must therefore be blanked out. This is carried out by circuit 9 which is, in the example under consideration, a so called sample-and-hold amplifier the basic wiring of which is shown in FIG. 15 and which simultaneously amplifies the useful signal. This module is provided with an analog switch 16, the output of which is connected by a resistance 17 to the positive input of a conventional operational amplifier 19; in addition a storage capacitor 18 is connected to the line connecting the resistance 17 to the operational amplifier 19. The analog switch 16, which is a known type, can be for example the TEXAS INSTRUMENTS module known by the designation TL 191. The operational amplifier 19 can be, for example, the TEXAS INSTRUMENTS component LM 348.

The analog switch 16 is located in the line carrying the voltage signals $u_s$ and has blanking pulses D (FIG. 6) applied to it by the pulse generator 11 (FIG. 1). These blanking pulses D are generated for a short time in the pulse generator 11, controlled by the control logic 10 by means of the switching pulses C, whenever a switching pulse C begins or ends, that is to say exactly at the angles of 45°, 135°, 225° and so forth at which the step positions occur. These blanking pulses D which are of constant duration and a little longer than the steps in the output signal of the differentiating circuit 8 cause in each case the analog switch 16 to open and the storage capacitor 18 to be disconnected, which capacitor is charged if voltage sections $u_s$ are present and the voltage of which remains nearly constant during the duration of the blanking pulses. In this manner, the step positions are blanked out at the output of the operational amplifier 19 or of the circuit 9, respectively, and an analog voltage u (FIG. 12) proportional to the angular velocity of the rotating part or to its speed of rotation, respectively, is generated which can be input as actual rotational speed value into a control or regulating system. In particular, this voltage u can be applied to the tacho input of a conventional 4-quadrant regulator which, in conventional rotational speed measuring systems, receives, with the aid of a tacho generator, the voltage generated by the latter. In general, both the actual position, that is to say the respective angular position, and the actual speed of rotation are needed for regulating rotating systems and particularly servo motors in positioning systems. In order to detect these two variables, an angle pick-up and a tacho generator have hitherto been required. If encoders are used as angle pick-ups which generate the two input signals v and w mentioned, the invention opens up the advantageous possibility of using the circuit arrangement described to derive both the actual speed of rotation and the actual position from the signals measured by the encoder so that the conventional tacho generator can be omitted. In FIG. 1, the inputs 23 used for detecting the actual position are indicated which are connected to the input lines for the input signals v and w.

Naturally, the circuit arrangement according to the invention can also be used for detecting the direction of rotation which is represented by the sign of the resultant voltage u. The example of FIG. 2 is based on a direction of rotation in which the input signal w leads the input signal v by 90°. If the rotating part rotates in the other direction, the input signal v generated conversely leads the other input signal w which results in a negative slope of the signal sections of the signal sections x1 and thus a positive tangent function and in signal sections z having a negative slope so that the result is that the output voltage u is negative.

In the typical embodiment described, it has been assumed that the input signals v and w have the ideal sine wave shape. However, the circuit arrangement can also process curve shapes which deviate more or less from the sine wave shape and which, on the one hand, include approximately trapezoidal and on the other hand approximately triangular measurement signals of which it is essentially required only that the positions of their zero crossings and of their extreme values on average correspond to those of a sine wave curve. The phase displacement of the input signals v and w also does not need to be exactly but only approximately 90°. The condition to be met by the input signals v and w in order to obtain a useable voltage u which is proportional to the speed of rotation or to the speed can also be expressed as follows: if the input signals v and w are superimposed as Lissajous figures on the oscillascope, a curve must be produced which is closed in itself and is uniform, that is to say without stress positions. This closed curve can deviate more or less from a circle which occurs with the input signals having an ideal sinusoidal form, and in particular become an ellipse if the phase shift deviates from 90°. All possible deformations and deviations from a sinusoidal shape (or from an exactly circular Lissajous figure) are averaged in the processing of the input signals described and the output signal produced is a voltage u, the average value of which, over in each case one period of the input signals, correctly represents the speed of rotation which, however, can show a more or less large ripple, depending on the deviations of the input signals from the ideal sinusoidal shape, and is absolutely without ripple only in the ideal case.

This is why irregularities which can occur in the characteristics of the input signals v and w as a result of any aging of the detectors or due to inaccuracies in the markings of the angle pick-up, due to temperature effects and other interfering influences, have virtually no effect on the accuracy of the detection of rotational speed. This is why it is also possible to transmit the input signals v and w without problems over longer distances without attenuations and interference occurring during this transmission being of significance for the evaluation.

The circuit arrangement according to the invention supplies usable output signals even with very slow rotational speed and can therefore be utilized, for example, in servo control loops which include a zero rotational speed in practice. The invention is not restricted to the described configuration of the circuit arrangement but permits manifold variants in detail for the development. In particular, generally all known two-quadrant dividers can be used for the divider circuit 5, for example. The circuit 9 which blanks out the step positions can also be designed in such a manner that the circuit switches, before occurrence of a step position, to another voltage signal which is also formed from voltage sections $U_s$ and which has been generated in the same manner as the first voltage signal $u_s$ but is electrically displaced by 45° in phase with respect to the latter. For this purpose, a second circuit with the components 1 to 8 can be provided which is essentially configured exactly like the circuit arrangement described but in which the four signals input into the curve changeover switch are in each case electrically displaced by 45° with respect to the signals input into the curve changeover switch of the first circuit. This phase shifting can be electronically implemented by once adding and once substracting the two input signals relatively v and w, that is to say forming the sum $\cos \alpha + \sin \alpha = \sqrt{2} \sin (45° + \alpha)$ and the difference $\cos \alpha - \sin \alpha = \sqrt{2} \cos (45° + \alpha)$ which can be easily carried out with known electronic circuits. These sum and difference signals are then processed in the same manner as the input signals v and w in a circuit arrangement comprising the components 1 to 8 described, in which arrangement a circuit replacing the circuit 9 described alternately switches the outputs of the two differentiating circuits of the first and of the second circuit arrangement.

What is claimed is:

1. Circuit arrangement for generating an electric velocity signal which is proportional to the velocity of a moving part and particularly to the speed of rotation of a rotating part, consisting of two continuous input signals (w, v) which are periodically changeable as a function of the position of this moving part, and particularly of the angle of rotation ($\phi$), and which are phase-shifted with respect to each other by approximately 90°, both having each in the mean the same frequency and a constant amplitude ratio and a sinusoidal or sine-like characteristic, a simple or integral multiple (N) of the duration of the period (T) of one input signal (w, v) being equal to the time in which the moving part covers a certain distance and particularly a rotating part carries out one full revolution, comprising:

(a) an inversion circuit (1) for inverting the two input signals (w, v);

(b) a curve change-over switch (2) having inputs for the input signals (w, v) and the inverted input signals ($\overline{w}, \overline{v}$) and having a first and a second output (3, 4) which are connected in predeterminable sequence with respective similar sections of the input and inverted input signals, retaining their relative phase relationships, one signal sequence of periodically repetitive signal sections (x1 and x2, respectively) each appearing at the first and at the second output (3, 4), which signal sections are in a range of values which is suitable for dividing the first signal section (x1) electrically by the second signal section (x2);

(c) a dividing circuit (5) which is connected to the outputs (3, 4) of the curve change-over switch (2) and which will divide in each case the signal section (x1) originating from the first output (3) by the signal section (x2) originating from the second output (4) whilst forming a sequence of quotient signals (y) which correspond to finite sections of a variation with time of a tangent function or of a tangent-like function of the path co-ordinate of the moving part and especially of the angle of rotation ($\alpha = N \cdot \phi$);

(d) a tangent/arc tangent converter circuit (7) which follows the divider circuit (5), for converting the quotient signals (y) into a sequence of path signals (z) which correspond to the arc tangent function or to an arc tangent-like function of these quotient signals (y) and in each case represent the variation of the path co-ordinates and particularly of the angle of rotation ($\alpha$) as a function of time (t) within successive intervals defined by the signal sections (x1, x2);

(e) a first differentiating circuit (8) which follows the converter circuit (7), for differentiating the path co-ordinates represented by the path signals (z), particularly of the angle ($\alpha$) after time (t), a sequence of voltage sections $u_s$ being formed which are interrupted by step positions and the voltage of which is proportional to the velocity of the moving part; and (f) a circuit (9) which blanks out the step positions and which supplies an analog voltage (u) which is proportional to the velocity of the moving part, said circuit (9) being connected to and processing the output of said differentiating circuit (8).

2. Circuit arrangement as claimed in claim 1, wherein the curve change-over switch (2) is controlled in such a manner that the variation of the tangent function produced is always within an angular range of approximately $-45°$ to $+45°$.

3. Circuit arrangement as claimed in claim 2, wherein the curve change-over switch (2) is switched over by a control logic (1) comprising comparators (20, 21) which compare the values of two input signals (v, w; v, $\overline{w}$), each of which are shifted in phase by about 90°, and which output switch-over pulses (A; B) during the times in which the value of the one input signal is greater than that of the other one.

4. Circuit arrangement as claimed in claim 3, wherein the circuit (9) blanking out the step positions comprises the following elements:

(a) a pulse generator (11) which is adapted to generate at the rate of the step positions blanking pulses (D) which are a little greater than the duration of the step positions;

(b) a sample and hold amplifier which comprises an analog switch (16) controlled by said pulse generator (11) generating at the rate of the step positions blanking pulses (D) which are a little greater than the duration of the step positions, said sample and hold amplifier comprising further an operational amplifier (19) which follows the analog switch via a resistance (17) and a storage capacitor (18) which is located at the input of the operational amplifier and which is switched away from the output signal of the differentiating circuit (8) by the analog switch (16) in the presence of the blanking pulses (D) for the purpose of blanking out the step positions.

5. Circuit arrangement as claimed in claim 4, wherein the pulse generator (11) is controlled by the control logic (10) in such a manner that blanking pulses (D) can be generated in each case at the beginning and at the end of each switch-over pulse (A; B).

6. Circuit arrangement as claimed in claim 1, wherein the circuit blanking out the step positions will process another output signal which is generated by a second circuit comprising the components 1-5,7 and 8, configured as the circuit of claim 1, and further comprising a phase shifting means, wherein said another output signal is shifted in phase by at least approximately 45° with respect to the output signal of the first differentiating circuit (8), in such a manner that the blanking out circuit switches alternately to sections of the another output signal and the output signal of the first differentiating circuit which are in each case free of step positions.

* * * * *